United States Patent Office 3,558,387

Patented Jan. 26, 1971

3,558,387

RADIATION-CURABLE COMPOSITIONS

Robert W. Bassemir, Jamaica, N.Y., and Daniel J. Carlick, Berkeley Heights, Richard Dennis, East Rutherford, and Gerald Feig, Springfield, N.J., assignors to Sun Chemical Corporation, New York, N.Y., a corporation of Delaware No Drawing. Continuation-in-part of application Ser. No. 556,568, June 10, 1966. This application Nov. 24, 1967, Ser. No. 685,305

Int. Cl. B32b *17/00;* C08f *1/16;* C08d *1/00*

U.S. Cl. 156—99 34 Claims

ABSTRACT OF THE DISCLOSURE

A photopolymerizable composition comprising at least one ester of an ethylenically unsaturated acid and a dihydric or trihydric alcohol, and having in addition thereto a film forming compound selected from aryl sulfonamide-formaldehyde resins and cetyl vinyl ether in the presence of photoinitiators consisting of acyloin and acyloin derivatives, and methods of use thereof, such as laminating and coating.

This application is a continuation-in-part of copending application S.N. 556,568 (filed June 10, 1966) now abandoned. It relates to photopolymerizable compositions, elements, and processes of photopolymerization. More particularly, this invention relates to compositions containing a photopolymerizable polyfunctional ethylenically unsaturated compound.

In the past, it has been known to prepare compositions such as coating materials and the like which consisted primarily of photopolymerizable ethylenically unsaturated monomeric material. It is also known that the degree of polymerization of these polymerizable organic compounds is altered under the action of light in that the compounds are converted to a higher degree of polymerization. Under direct radiation, this conversion proceeds very slowly. Since the polymerizable compounds absorb only short wave length light when being converted, photopolymerization by direct radiation has not gained substantial practical application. Attempts have been made, therefore, to find substances which may be added to the polymerizable compounds to accelerate their polymerization.

As sensitizers or photoinitiators, there have been used compounds of the type of the benzoins. These absorb light rays and, as a result, free radicals are formed which are capable of initiating polymerization. The use of sensitizers or photoinitiators such as benzoin, however, requires the polymerization to take place in the absence of oxygen since oxygen tends to inhibit photopolymerization, especially when the material is in the form of thin films. Various methods of excluding oxygen have been proposed, but they are cumbersome and expensive to use; although the prior art processes have proved satisfactory for their intended purposes, the practical applications thereof are limited.

It is, therefore, an object of the present invention to provide new and improved photopolymerizable compositions, elements, and processes of photopolymerization.

It is another object of the present invention to provide such compositions which in the form of thin fluid layers can be photopolymerized to a solid form in a short period of time.

Another object of the present invention is to provide such compositions which are rapidly curable in the presence of atmospheric oxygen.

Still further objects and the entire scope of applicability of the present invention will become apparent from the detailed description given hereinafter; it should be understood, however, that the detailed description and the specific examples, while indicating preferred embodiments of the invention, are given by way of illustration only, since various changes and modifications within the spirit and scope of the invention will become apparent to those skilled in the art.

It has been found that the foregoing objects may be attained by modifying the photopolymerizable compound to reduce or substantially eliminate the polymerization-inhibiting effect of atmospheric oxygen. This may be accomplished by the addition to the compound and photoinitiator of a compatible film-forming compound which will substantially reduce the inhibitory period in the polymerization reaction caused by the presence of oxygen.

In one embodiment of the present invention, the photopolymerizable compound may be modified by the inclusion of a compatible unsaturated material which is reactive with oxygen. In another embodiment, a compatible material which is coreactive with the compound in the presence of oxygen may be introduced. The coreactive material may be monomeric or polymeric in form, may link up with the compound, and otherwise improve various properties thereof. In still another embodiment of the present invention, a chain transfer agent, e.g., a material capable of chain propagation, may be added. Mixtures of the above components are also within the teachings of the present invention and, where necessary, stabilizers may be added.

The photopolymerizable compounds usable in the present invention are free radical polymerizable polyethylenically unsaturated monomers and prepolymers, e.g., dimers, trimers, and other oligomers, and mixtures and copolymers thereof. The term "polyethylenically unsaturated" as employed in the specification and claims refers to compounds having two or more terminal ethylenic groups. The preferred photopolymerizable monomers or polymers may be generally described as the acrylic acid, methacrylic acid, and itaconic acid esters of aliphatic polyhydric alcohols such as, for example, the di- and polyacrylates, the di- and polymethacrylates, and the di- and polyitaconates of ethylene glycol triethylene glycol, tetraethylene glycol, tetramethylene glycol, trimethylolethane, trimethylolpropane, and the like. For some purposes, it is further preferred that the monomers be high boiling, i.e., have a boiling point above about 200° C. Typical photopolymerizable compounds include trimethylolpropane triacrylate, trimethylolethane triacrylate, trimethylolpropane trimethacrylate, trimethylolethane trimethacrylate, tetramethylene glycol dimethacrylate, ethylene glycol dimethacrylate, triethylene glycol dimethylacrylate, tetraethylene glycol diacrylate, tetraethylene glycol dimethacrylate, and the like; and the prepolymers and mixtures thereof. The photopolymerizable compounds may be used in amounts ranging between about 15 and 90% by weight of the complete photopolymerizable composition.

The above-described esters of aliphatic polyhydric alcohols may be obtained in any convenient manner, for example, by the ester interchange method of interacting a lower alkyl ester of the acid with the alcohol in the presence of a suitable catalyst or by the reaction of the alcohol with, e.g., acrylic or methacrylic acid or with an acrylyl or a methacrylyl halide.

The photoinitiators or sensitizers are used in amounts of from about 1 to 25% by weight, and preferably from about 2% to 15%, of the total photopolymerizable composition. Preferred photoinitiators include acyloins and derivatives thereof, such as, for example, benzoin methyl ether, benzoin ethyl ether, desyl bromide, desyl chloride, desyl amine, and the like, and mixtures thereof.

Variables determining the rate at which a photopolymerizable composition will cure include the specific ingredients in the composition, concentration of the photoinitiators, thickness of the material, nature and intensity of the radiation source and its distance from the material, the presence or absence of oxygen, and the temperature of the surrounding atmosphere. The compositions of the present invention may be used in relatively thick layers or may be used as thin films having thicknesses of from about 0.5 to 150 microns, and preferably from about 1 to 10 microns. Some of the sources of radiation used are a 100-watt Hanovia high pressure mercury arc quartz ultraviolet lamp, larger ultraviolet sources of higher wattage, a linear electron accelerator, or gamma radiation emitters, such as cobalt-60. Distances of the lamp from the work may range from about ¼ to 10 inches, and preferably from about ¼ to 3 inches.

Photopolymerizable compositions containing only free radical polymerizable ethylenically unsaturated monomers or prepolymers together with a suitable photoinitiator require up to 2000 seconds and greater exposure at a distance of 1 inch from a 100-watt lamp to dry when in thin films. This time may be substantially reduced by excluding oxygen from the reaction. In many practical applications, however, such as the use of photopolymerizable compositions in coatings or in printing inks, exclusion of oxygen is difficult and/or expensive to achieve. In the present invention, therefore, materials are added to a photopolymerizable compound which are compatible therewith and which will reduce the polymerization-inhibiting effect of oxygen.

In one embodiment of the present invention, an unsaturated compound which is reactive with oxygen is added to the photopolymerizable monomer or prepolymer. Suitable unsaturated compounds include polyester resins, especially unsaturated alkyd resins; conjugated drying oils, e.g., tung oil and Chinawood oil; and oil-modified alkyd resins, i.e., tung oil- and Chinawood oil-modified alkyd resins. The unsaturated compound preferably contains one or more allylic groups and may be used in amounts of from about 10 to 60% by weight of the total composition. Using this composition, including the monomers or prepolymers and the photoinitiators described above, polymerization to a solid state may be accomplished in the presence of oxygen in 60 seconds or less.

In another embodiment of the present invention, the photopolymerizable ester is modified by the inclusion of a compatible material which is coreactive with it in the presence of oxygen. A viscosity control agent, for example, may be introduced into the system to cross-link with the compound and add plasticizing properties thereto. One suitable viscosity control agent is an aryl sulfonamide-formaldehyde resin, such as p-toulene sulfonamide-formaldehyde resin. The viscosity control agent may be used in amounts of about 10 to 70% by weight of the total composition; polymerization takes place in thin films of from about 1 to 50 microns in from about 2 to 5 seconds in the presence of atmospheric oxygen and using an energy source such as an ultraviolet lamp. There is a considerable reduction in the surface inhibition heretofore encountered in thin film photopolymerization of photopolymerizable compounds without such viscosity control agent modification wherein surface curing of films less than 10 microns thick required more than 2000 seconds. The speed of reaction can be further accelerated by the use of an inert gas blanket and moderately elevated temperatures, although it will take place satisfactorily at ambient conditions.

Other coreactive substances which may be added to the photopolymerizable monomer or prepolymer include unsaturated polyester resins, epoxy resins, urea formaldehyde resins, and cetyl vinyl ether. These substances react with the monomer or prepolymer and improve various properties of the composition. The polyester resins, for example, improve the adhesive, plasticizing, and rheological properties of the composition. The epoxy resins, i.e., synthetic resins possessing terminal epoxide groups, e.g., a lower molecular weight polymer produced by condensation of epichlorhydrin with bisphenol A, produce excellent bonding and result in flexible films which are especially suitable for lamination purposes. The urea formaldehyde resins work particularly well in heat catalyst systems wherein the temperature of the surrounding atmosphere is raised to about 150° F. or higher. The cetyl vinyl ether lends plasticizing properties to the photopolymerizable composition. These resins and monomers may be utilized in amounts between about 10 and 50% of the total composition.

Prepolymers, such as diallyl phthalate prepolymers, may be added to the photopolymerizable ester to react therewith in the presence of oxygen. The prepolymers may be used in amounts of from about 10 to 50% by weight of the total composition and result in tough, more flexible surface-cured films obtainable in the presence of oxygen.

The above-described photopolymerizable monomer or prepolymer may also be improved by the inclusion of from about 0.5 to 50% by weight of a chain transfer agent. Suitable compounds include the mercaptans and derivatives thereof, e.g., glycol mercaptoactate and ethyl mercaptoacetate; tertiary aliphatic amines, e.g., triethanolamine and t-butyldiethanolamine; morpholine; n-amino morpholine; and cyclicized unsaturated aromatic hydrocarbons, e.g., neohexene, cyclohexene, cyclooctene, and d-limonene; and the like; and their mixtures. Typical cure times of compositions including chain transfer agents have been as low as one-half second when a film of from about 1 to 10 microns is exposed to actinic energy under the above conditions. Use of an inert gas or vapor blanket further increases the speed of reaction to a marked degree. Polymerization of compositions including chain transfer agents during storage of extended periods may be retarded by the inclusion of from about 0.1 to 5% of a stabilizer which is compatible with the photopolymerizable composition and does not significantly affect the polymerization rate thereof when exposed to ultraviolet light. Such a stabilizer is typified by diethylhydroxylamine.

The above-described additives may further be used in varying mixtures. As will be seen more particularly in the following examples, the photopolymerizable esters of the present invention may be modified by the addition of a prepolymer and a chain transfer agent; a prepolymer and an unsaturated compound reactive with oxygen, e.g., an alkyd resin; a prepolymer and a further modifying substance, e.g., cetyl vinyl ether; a viscosity control agent together with a chain transfer agent, a prepolymer or other modifying resin; and mixtures thereof. In general, in the photopolymerizable compound may be utilized in amounts of from about 15 to 90% by weight and the modifying compound or compounds in amounts of from about 10 to 85% by weight. In some embodiments, the presence of an inert atmosphere, e.g., carbon dioxide, and the use of moderately elevated temperatures, e.g., from 150 to 180° F., are preferred.

The photopolymerizable compositions of the present invention are suitable as adhesives, particularly in the laminating art; as coatings for metals, plastics, textiles, paper, and glass; as markers for roads, parking lots, airfields, and similar surfaces; as vehicles for printing inks, lacquers, and paints; and in the preparation of photopolymerizable elements, i.e., a support having disposed thereon a photopolymerizable layer of a composition as described herein. Furthermore, various dyestuffs, pigments, plasticizers, lubricants, and other modifiers may be incorporated to obtain certain desired characteristics in the finished products.

When the photopolymerizable compositions of the present invention are used as an adhesive, one of the lamina must be translucent when ultraviolet light is used. When the radiation source is an electron beam, one of the lamina must be capable of transmitting high energy electrons and neither is necessarily translucent to light. Typical laminations include cellophane to cellophane films, treated polyethylene to treated polyethylene films, and Mylar to a metal substrate such as copper. Particularly suitable compositions for use in lamination include mixtures of a photopolymerizable ester with both an aryl sulfonamide-formaldehyde resin and an epoxy resin. The latter system gives a highly suitable, flexible plasticized film giving a tear seal for cellophane to cellophane and cellophane to treated polypropylene laminations and near tear seals for treated polyethylene to treated polyethylene laminations.

The photopolymerizable compositions of the present invention may be utilized for metal coatings and particularly for metals which are to be subsequently printed. Glass and certain plastics may also be coated, and the coatings are conventionally applied by roller or spray. Pigmented coating systems may be used for various polyester and vinyl films; glass; cellophane; treated and untreated polyethylene, for example, in the form of disposable cups or bottles; and the like. Examples of metals which may be coated include sized and unsized tin plate.

When used as vehicles for inks, e.g., printing inks, the compositions of the present invention should include photopolymerizable monomers or prepolymers which are high boiling. The compositions may be pigmented with many organic or inorganic pigments, e.g., molybdate orange, phthalocyanine blue, titanium white, chrome yellow, and carbon black, as well as colored by conventional dyes. Stock which may be printed includes paper, clay-coated paper, and board. In addition, the compositions of the present invention are suitable for the treatment of textiles, both natural and synthetic, e.g., as in vehicles for textile printing inks or for specialized treatments of fabrics to produce water repellency, oil and stain resistance, crease resistance, etc.

Photopolymerizable elements of this invention comprise a support, e.g., a sheet or plate, having superimposed thereon a layer of the above-described photopolymerizable compositions. Suitable base or support materials include metals, e.g., steel and aluminum plates, sheets and foils, and films or plates composed of various film-forming synthetic resins or high polymers, such as addition polymers, and in particular vinyl polymers, e.g., vinyl chloride polymers; vinylidene chloride polymers; vinylident chloride copolymers with vinyl chloride, vinyl acetate, or acrylonitrile; and vinyl chloride copolymers with vinyl acetate or acrylonitrile; linear condensation polymers such as polyesters, e.g., polyethylene terephthalate; polyamides; etc. Fillers or reinforcing agents can be present in the synthetic resin or polymer bases. In addition, highly reflective bases may be treated to absorb ultraviolet light or a light-absorbitive layer can be transposed between the base and photopolymerizable layer.

Photopolymerizable elements can be made by exposing to ultraviolet light selected portions of the photopolymerizable layer thereof until addition polymerization is completed to the desired depth in the exposed portions. The unexposed portions of the layer are then removed, e.g., by use of solvents which dissolve the monomer or prepolymer but not the polymer.

The invention and its advantages will be better understood with reference to the following illustrative examples, but it is not intended to be limited thereto. In the examples, parts are given by weight unless otherwise specified. Unless otherwise indicated in the following examples, the ingredients were mixed until thoroughly blended. When a specific ingredient is solid at room temperature, the mixture may be heated to melt the solid ingredient, but generally not above 100° C. The atmospheric and temperature conditions were ambient unless otherwise noted, and the compositions were exposed at a distance of 1 inch from a 100-watt Hanovia high pressure mercury arc qhartz ultraviolet lamp in film thicknesses between 1 and 10 microns (Examples 1 through 26). When applied between two substrates, amounts between one-half and 15 pounds per ream were utilized with good effect.

EXAMPLE 1

The following composition was prepared:

| Ingredients: | Parts by weight |
|---|---|
| Trimethylolpropane trimethacrylate | 98 |
| Benzoin methyl ether | 2 |

The composition required greater than 2000 seconds exposure at 1 inch from a 100-watt Hanovia lamp to polymerize into a solid gel at film thicknesses between 1 and 10 microns in the presence of a normal atmosphere.

When applied between two transparent substrates, such as cellophane films or glass platen, the composition formed a dry rigid gel in about 4 seconds.

EXAMPLE 2

To 95.0 grams of the composition of Example 1 was added 5.0 grams of glycol dimercaptoacetate. When exposed in film form as in Example 1 in the presence of normal atmospheric oxygen, the composition required 10 seconds to polymerize into a dry rigid gel.

When a thin film was pressed between two transparent substrates to exclude the atmosphere, as in Example 1, the polymerization required about 1 second.

EXAMPLE 3

The following composition was prepared:

| Ingredients: | Parts by weight |
|---|---|
| Trimethylolpropane triacrylate | 40.0 |
| Chinawood oil-modified alkyd | 40.0 |
| Benzoin methyl ether | 20.0 |

The composition required about 15 seconds to cure to a dry rigid gel in the presence of a normal atmosphere.

When applied as a coating between two transparent substrates, this composition required about 2 seconds to achieve complete polymerization.

EXAMPLE 4

The following composition was prepared:

| Ingredients: | Parts by weight |
|---|---|
| Trimethylolpropane triacrylate | 70.0 |
| Diallyl phthalate prepolymer | 10.0 |
| Benzoin ethyl ether | 20.0 |

The composition required about 20 seconds to polymerize to a rigid dry gel in film thicknesses of from 1 to 10 microns in a normal atmosphere.

When this composition was coated between two transparent substrates, polymerization was achieved in about 2 seconds.

EXAMPLE 5

To 95.0 grams of the composition of Example 4 was added 5.0 grams of triethanolamine. When exposed as in Example 1 in thin films in the presence of normal atmospheric oxygen, the composition polymerized to a dry rigid gel in about 2 seconds.

When applied as a coating between two transparent substrates, the polymerization required approximately 1 second.

EXAMPLE 6

The following composition was prepared:

| Ingredients: | Parts by weight |
|---|---|
| Trimethylolpropane triacrylate | 65.0 |
| Benzoin ethyl ether | 20.0 |
| Chinawood oil-modified alkyd | 10.0 |
| Diallyl phthalate prepolymer | 5.0 |

The composition required from 10 to 15 seconds to polymerize to a dry and rigid gel in a normal atmosphere in film thicknesses betwen 1 and 10 microns.

EXAMPLE 7

The chinawood oil-modified alkyd of Example 6 was replaced by 10.0 parts of cetyl vinyl ether. Approximately 25 seconds were required for polymerization to a dry gel which had increased flexibility over that obtained in Example 6. When the composition was coated between two transparent substrates, a more flexible bond was formed between the substrates in 3 seconds.

EXAMPLE 8

The following composition was prepared:

| Ingredients: | Parts by weight |
|---|---|
| Trimethylolpropane triacrylate | 49.0 |
| p-Toluene sulfonamide-formaldehyde resin | 49.0 |
| Benzoin methyl ether | 2.0 |

The composition required about 60 seconds at an exposure of 1 inch from a 100-watt Hanovia lamp in a normal atmosphere to form a dry solid gel at film thicknesses of from 1 to 10 microns, in comparison to Example 1 where over 2000 seconds were required.

EXAMPLE 9

To 99.0 parts of the composition of Example 8 was added 1 part of triethanolamine. When exposed in a thin film, as in Example 8, the composition polymerized to a dry rigid gel in about 3 seconds under normal atmospheric conditions.

EXAMPLE 10

To 99.0 parts of the composition of Example 8 was added 1 part of cyclohexene. The composition polymerized in about 5 seconds to a dry rigid film when exposed under the conditions of Example 8.

EXAMPLE 11

The following composition was prepared:

| Ingredients: | Parts by weight |
|---|---|
| Trimethylolpropane triacrylate | 47.0 |
| p-Toluene sulfonamide-formaldehyde resin | 47.0 |
| Benzoin methyl ether | 5.0 |
| Triethanolamine | 1.0 |

The composition in film thicknesses of from 1 to 10 microns required about 1 second to polymerize in the presence of a carbon dioxide inert gas blanket. When conducted in the presence of an elevated temperature of 180° F., polymerization of this system was completed in less than 1 second in the presence of the inert gas blanket.

EXAMPLE 12

The following composition was prepared:

| Ingredients: | Parts by weight |
|---|---|
| Trimethylolpropane triacrylate | 48.5 |
| Benzoin methyl ether | 2.0 |
| Cyclohexene | 1.0 |
| Urea-formaldehyde condensate | 48.5 |

The composition required 15 seconds to cure to a dry rigid gel in the presence of a normal atmosphere at an elevated temperature of 180° F. When polymerized in thin films in the presence of a $CO_2$ inert gas blanket, such polymerization required about 1 second to form a dry rigid film.

EXAMPLE 13

The following composition was prepared:

| Ingredients: | Parts by weight |
|---|---|
| Trimethylolpropane triacrylate | 38.5 |
| Diallyl phthalate prepolymer | 10.0 |
| p-Toluene sulfonamide-formaldehyde resin | 48.5 |
| Benzoin methyl ether | 2.0 |
| Triethanolamine | 1.0 |

The composition required about 2 seconds to cure to a dry rigid film under normal atmospheric conditions at room temperature of 770° F. At elevated temperatures (180° F.) polymerization required about 1 second. When the system was purged with a $CO_2$ blanket, ½ second was required to form a cured film (180° F.).

EXAMPLE 14

The following composition was prepared:

| Ingredients: | Parts by weight |
|---|---|
| Trimethylolpropane triacrylate | 38.5 |
| Urea-formaldehyde condensate | 48.5 |
| Diallyl phthalate prepolymer | 10.0 |
| Triethanolamine | 1.0 |
| Benzoin methyl ether | 2.0 |

The composition required approximately 15 seconds to cure at an elevated temperature of 180° F. in a normal atmosphere. In the presence of an inert atmosphere, approximately 2 seconds was required to form a dry rigid film.

EXAMPLE 15

The following composition was prepared:

| Ingredients: | Parts by weight |
|---|---|
| Trimethylolpropane triacrylate | 24.0 |
| Epoxy resin | 48.0 |
| p-Toluene sulfonamide-formaldehyde resin | 24.0 |
| Benzoin methyl ether | 2.0 |
| Neohexene | 2.0 |

The composition required approximately 15 seconds to cure under normal atmospheric conditions. When used to laminate two films of cellophane, the composition produced a flexible adhesive bond between the films. The polymerization was completed in about 3 seconds under the conditions stated in Example 1, using about 3 pounds per ream of the composition.

EXAMPLE 16

The following composition was prepared:

| Ingredients: | Parts by weight |
|---|---|
| Trimethylolpropane triacrylate | 44.5 |
| Benzoin methyl ether | 10.0 |
| p-Toluene sulfonamide-formaldehyde resin | 44.5 |
| Diethylhydroxylamine | 1.0 |

The composition was found to be stable when exposed for greater than 120 hours at 150° F. in the dark. Without the addition of the diethylhydroxylamine, the composition was found to be unstable in less than 24 hours at 150° F. in the dark.

The compositions illustrated by Examples 1–16 were colored with a wide variety of inorganic and organic pigments and dyes.

The following is an illustrative example:

EXAMPLE 17

| Ingredients: | Parts by weight |
|---|---|
| Trimethylolpropane triacrylate | 37.0 |
| Molybdate orange pigment | 20.0 |
| Diethylhydroxylamine | 0.4 |
| Benzoin methyl ether | 4.0 |
| p-Toluene sulfonamide-formaldehyde resin | 37.0 |
| Cyclohexene | 1.6 |

The pigment was dispersed into the vehicle composition by means of a conventional 3-roller mill apparatus. The ink composition at film thicknesses of 1–10 microns cured to a dry film under normal atmospheric conditions in about 1 second at a distance of 1 inch from a 12" Hanovia ultraviolet lamp.

EXAMPLE 18

(A) A mixture of dimers and trimers, i.e., a prepolymer, of trimethylolpropane triacrylate was prepared as follows: the benzene of a solution of 95 parts of trimethylolpropane triacrylate in 5 parts of benzene was distilled off at 60–70° C. under a reduced pressure of 30 mm. Hg absolute or less. During the course of the distillation the contents of the distillation apparatus congealed to a more or less stiff gel, depending upon the duration of the distilling procedure.

The gel was a mixture of low polymers of trimethylolpropane triacrylate. It was separable into fractions of varying degrees of polymerization by consecutive extraction with appropriate solvents; for example, a benzene extract contained only the monomer, dimer, and some trimer which could be separated from each other by fractional precipitation with hexane. Fluorinated hydrocarbons could be used to dissolve higher polymers which could thus be obtained from that portion of the polymer which was insoluble in benzene.

(B) A composition prepared from 70 parts of a prepolymer mixture of part (A), 10 parts of a diallyl phthalate prepolymer, and 20 parts of benzoin ethyl ether dried to a rigid gel in 10 seconds at a distance of ½ inch from a 100-watt Hanovia lamp.

EXAMPLES 19–26

The procedures of Examples 2, 3, 4, 6, 13, 15, 17, and 18 were repeated using monomers and prepolymers of trimethylolpropane trimethacrylate, of tetraethylene glycol dimethylacrylate, and of trimethylolethane triacrylate instead of trimethylolpropane triacrylate. The results were comparable.

EXAMPLES 27–43

The procedures of Examples 2, 3, 4, 6, 13, 15, 17, and 18 through 26 were repeated except that instead of being exposed to ultraviolet light the compositions were passed on a conveyor belt beneath the beam of a 300,000-volt linear electron accelerator at a speed and beam current so regulated as to produce a dose rate of 0.5 megarad. These systems produced resinous materials of varying degrees of hardness in films from 0.2 to 5.0 mils thick.

It will be appreciated that various modifications may be made in the products and procedures described herein without in any way deviating from the scope of the invention as defined in the following claims.

What is claimed is:

1. A radiation-curable composition consisting essentially of about 15 to 90 weight percent of (1) at least one ester of an ethylenically unsaturated acid and a dihydric alcohol or a trihydric alcohol, about 1 to 25 weight percent of (2) acyloin or an acyloin derivative, and about 10 to 85 weight percent of (3) an aryl sulfonamide-formaldehyde resin.

2. A radiation-curable composition consisting essentially of about 15 to 90 weight percent of (1) at least one ester of an ethylenically unsaturated acid and a dihydric alcohol or a trihydric alcohol, about 1 to 25 weight percent of (2) acyloin or an acyloin derivative, and about 10 to 85 weight percent of (3) cetyl vinyl ether.

3. The composition of claim 2 wherein the ester is an acrylate, a methacrylate, or an itaconate.

4. The composition of claim 2 wherein the composition additionally contains from about 0.5 to 50 percent by weight of a chain-transfer agent selected from the group consisting of mercaptans, tertiary aliphatic amines, morpholine, n-amino morpholine, cyclicized unsaturated aromatic hydrocarbons, and mixtures thereof.

5. The composition of claim 4 containing also about 0.01 to 5 percent by weight of a compound to stabilize said composition during storage.

6. A printing ink comprising a colorant and the composition of claim 2 as a binder, said colorant being selected from the group consisting of pigments and dyes.

7. A radiation-curable element comprising a support and a coating thereon of the composition of claim 2.

8. An adhesive comprising the composition of claim 2.

9. A coating composition comprising the composition of claim 2.

10. A printing ink comprising a colorant and the composition of claim 4.

11. A method of drying which comprises exposing the composition of claim 2 to radiation.

12. A method of laminating which comprises joining two members with an intermediate layer comprising the composition of claim 2 and exposing said intermediate layer to a source of radiation whereby said intermediate layer is dried and adhesively joins said members.

13. The composition of claim 1 wherein the ester is an acrylate, a methacryate, or an itaconate.

14. The composition of claim 1 wherein the alcohol is trimethylolethane.

15. The composition of claim 1 wherein the alcohol is trimethylolpropane.

16. The composition of claim 1 wherein the alcohol is tetraethylene glycol.

17. The radiation-curable composition of claim 1 wherein the composition additionally contains from about 0.5 to 50 percent by weight of a chain-transfer agent selected from the group consisting of mercaptans, tertiary aliphatic amines, morpholine, n-amino morpholine, cyclicized unsaturated aromatic hydrocarbons, and mixtures thereof.

18. The radiation-curable composition of claim 17 containing also from about 0.01 to 5 percent by weight of a compound to stabilize said composition during storage.

19. The composition of claim 1 wherein the acyloin derivative is benzoin methyl ether.

20. The composition of claim 1 wherein the acyloin derivative is benzoin ethyl ether.

21. A printing ink comprising a colorant and the radiation-curable composition of claim 1 as a binder, said colorant being selected from the group consisting of pigments and dyes.

22. A radiation-curable element comprising a support and a coating thereon of the photopolymerizable composition of claim 1.

23. An adhesive comprising the composition of claim 1.

24. A coating composition comprising the composition of claim 1.

25. A method of drying which comprises exposing the composition of claim 1 to radiation.

26. A method of drying which comprises exposing the composition of claim 1 to ultraviolet light.

27. A method of drying which comprises exposing the composition of claim 1 to electron beam radiation.

28. A method of laminating which comprises joining two members with an intermediate layer comprising the composition of claim 1 and exposing said intermediate layer to a source of radiation whereby said intermediate layer is dried and adhesively joins said members.

29. A method of laminating which comprises joining two members by an intermediate layer comprising the composition of claim 1, at least one of said members being capable of transmitting ultraviolet light, and exposing said intermediate layer to ultraviolet light, thereby drying said intermediate layer and adhesively joining said members.

30. A method of laminating which comprises joining two members by an intermediate layer comprising the composition of claim 1, at least one of said members being capable of transmitting high energy electrons, and exposing said intermediate layer to electron beam radiation, thereby drying said intermediate layer and adhesively joining said members.

31. An article having a dried coating of the composition of claim 1 thereon.

32. A printing ink comprising a colorant and the radiation-curable composition of claim 17 as a binder.

33. An adhesive comprising the composition of claim 17.

34. A coating composition comprising the composition of claim 17.

References Cited

UNITED STATES PATENTS

| | | | |
|---|---|---|---|
| 3,036,086 | 5/1962 | Adicoff | 204—159.23 |
| 3,203,802 | 8/1965 | Burg | 204—159.23 |

OTHER REFERENCES

Burlant et al., γ-initiated Crosslinking of Unsaturated Polyesters, Jrnl. of Polymer Science, vol. 61, pp. 303–309 (1962).

SAMUEL H. BLECH, Primary Examiner

R. B. TURER, Assistant Examiner

U.S. Cl. X.R.

117—12, 93.31, 124, 132, 138.8, 155, 161; 156—322; 161—184, 218, 249; 204—159.15, 159.23; 260—23, 39, 41, 78.5 86.1, 836, 837, 850, 872, 885